United States Patent

[11] 3,617,149

[72] Inventor Myron R. Gibson
        Edelstein, Ill.
[21] Appl. No. 863,909
[22] Filed Oct. 6, 1969
[45] Patented Nov. 2, 1971
[73] Assignee Caterpillar Tractor Co.
        Peoria, Ill.

[54] AIR INLET FILTER ASSEMBLY
     5 Claims, 4 Drawing Figs.
[52] U.S. Cl. .................................................. 415/121,
                                    55/481, 55/498, 55/510
[51] Int. Cl. .................................................. F04b 39/16
[50] Field of Search ........................................ 55/306,
           276, 467, 471, 498, 500, 502, 505, 510, 481;
                                          123/119; 415/121

[56]                  References Cited
                UNITED STATES PATENTS
2,591,198   4/1952   Ringe ........................... 55/498
2,871,976   2/1959   Sebok ........................... 55/276
3,402,881   9/1968   Moore et al. ................... 55/306
3,444,672   5/1969   Alsobrooks ................... 55/306
3,483,676  12/1969   Sargisson ..................... 55/306
                FOREIGN PATENTS
1,024,628   1/1953   France .......................... 55/276
                OTHER REFERENCES
German Printed Patent application 1,097,077 dated 1-1961
Monchengladbach 2 sh. dwg.–2 sh. spec. (A copy in 415-121)

Primary Examiner—Frank W. Lutter
Assistant Examiner—Bernard Nozick
Attorney—Fryer, Tjensvold, Feix, Phillips and Lempio ABSTRACT: An air inlet filter assembly comprises a housing attached adjacent to the air intake of a gas turbine, for example. A cylindrical air cleaner is mounted in the housing to define an annular outer chamber thereabout which communicates directly with an inlet cowl. Ambient air exhibiting nonuniform pressure characteristics is circulated through the outer chamber and directed radially inwardly through the filter whereby the pressure characteristics of such airflows are rendered substantially uniform when communicated to the air intake of the gas turbine.

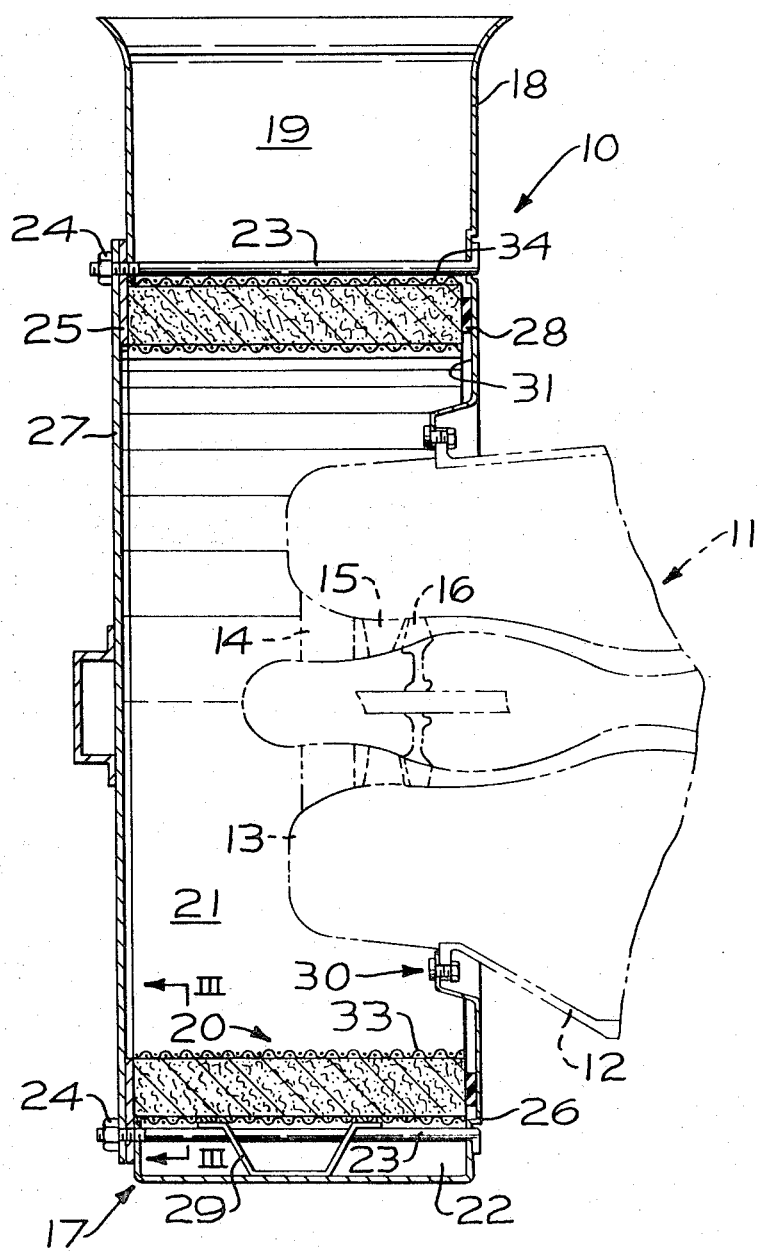

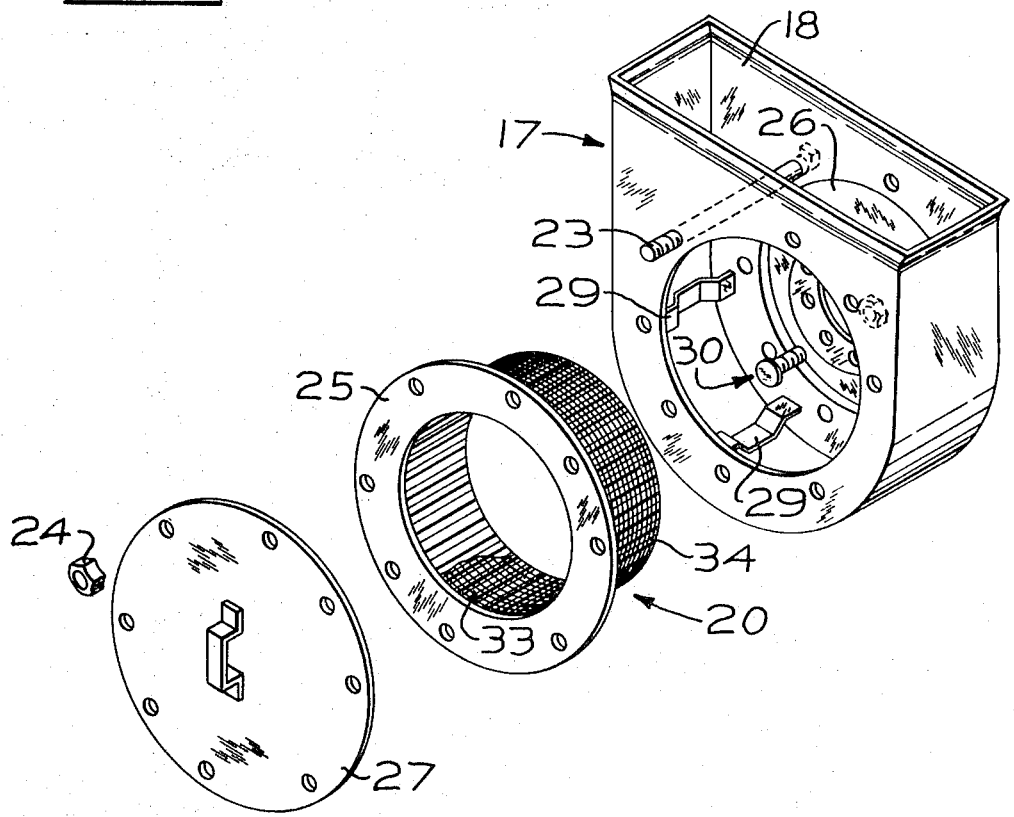

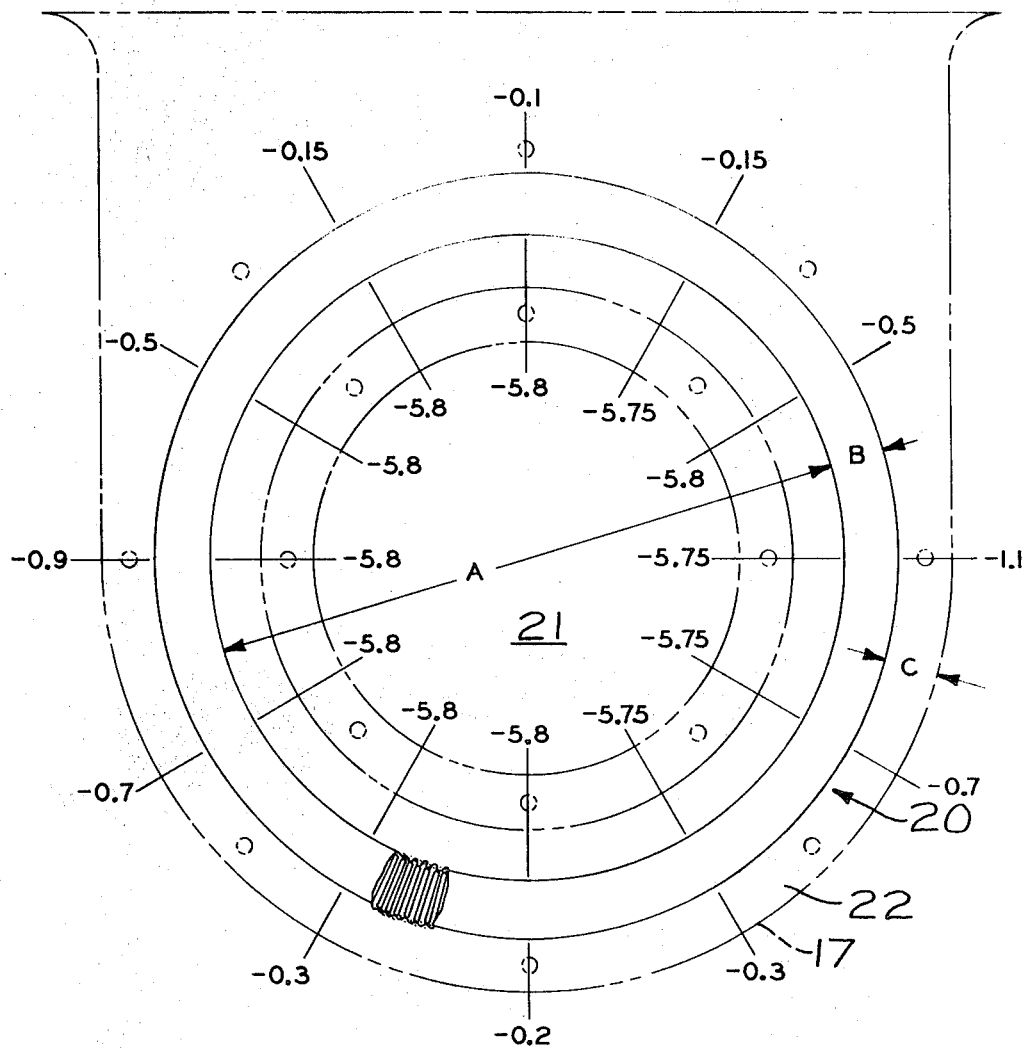
Fig-4-
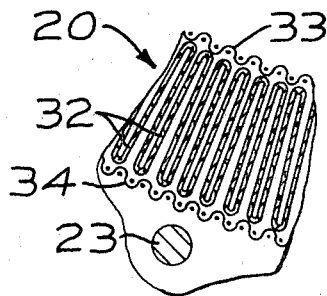
Fig-3-
INVENTOR
MYRON R. GIBSON

AIR INLET FILTER ASSEMBLY

The advent of high performance engines, such as turbocharged diesels and gas turbines, dictates the need for supplying such engines with sufficient quantities of "clean" air exhibiting substantially uniform pressure characteristics to assure engine durability and efficient operation. Conventional air-filtering arrangements, such as those employing air cleaners of the flat panel type, generally exhibit large cross-sectional areas and tend to induce nonuniform airflow therethrough due to their manner of installation and general arrangement. In addition, conventional filtering arrangements are oftentimes bulky and expensive to manufacture and assemble and tend to create pressure and velocity distortions to the filtered airflow due to the tortuous paths thereof.

An object of this invention is to overcome the above, briefly described problems by providing an economical and compact air inlet filter assembly featuring a large and uniform flow capacity with minimal flow distortion. In one embodiment hereinafter described, the filter assembly comprises a housing having a cylindrical air cleaner disposed therein to preferably define an inner chamber and an annular outer chamber positioned to direct air radially inwardly through the filter and to the inner chamber. The filter assembly is particularly adapted for attachment to the compressor stage of a supercharged diesel engine, gas turbine or similar air-consuming power plant. Another feature of this invention is the provision of an air cleaner means which will render the nonuniform pressure characteristics of ambient air substantially uniform for engine consumption purposes.

Other objects of this invention will become apparent from the following description and accompanying drawings wherein:

FIG. 1 is a cross-sectional view of an air inlet filter assembly attached to the compressor stage of a gas turbine, shown in phantom lines;

FIG. 2 is an exploded view of the FIG. 1 filter assembly;

FIG. 3 is an enlarged sectional view taken in the direction of arrows 3—3 in FIG. 1; and FIG. 4 schematically illustrates static pressures occurring around the filter assembly during operation thereof.

FIG. 1 illustrates an air inlet filter assembly 10 attached in overhanging relationship with respect to a compressor stage 11 of a gas turbine engine to ensure substantially direct passage of ambient air thereto. The gas turbine, shown in phantom lines, may comprise a tubular housing 12 defining an air intake 13. Stators 14, vanes 15 and blades 16 are suitably arranged in a conventional manner to direct ambient air to the turbine's combustion chamber (not shown). Although the filter assembly is shown employed with a gas turbine, it should be understood that such assembly may be employed with other devices or power plants, such as the compressor utilized with a turbocharged diesel engine.

The filter assembly comprises a housing 17 having an inlet cowl 18 attached thereto to define a rectangular inlet passage 19 disposed substantially perpendicular relative to a longitudinal axis of the housing. A cylindrical filter or air cleaner means 20 is disposed in the housing to define a circular and closed inner chamber 21 and an annular outer chamber 22, positioned substantially around the filter to direct incoming air radially inwardly to the inner chamber. Otherwise stated, ambient air is directed radially inwardly towards the longitudinal axis of the filter, housing 17 and the turbine and substantially directly into the turbine's inlet passage 13.

Hooks 23 and nuts 24 may be utilized to secure the filter in position between a backup plate 25 and a rear wall 26 of the housing. A removable cover plate 27, disposed perpendicular to the longitudinal axis of housing 17, is attached to the backup plate by the hooknuts to cover one side of the filter and inner chamber to block passage of air directly into such chamber. An annular plastic or rubber ring seal 28 may be utilized to assure that all incoming air is directed through the filter.

U-shaped metal guides 29 may be suitably spaced around the filter (FIG. 2) and secured by spot welds or the like to housing 17. Such members aid in guiding and centering the filter into its correct position and to maintain a substantially constant cross-sectional area throughout a substantial length of outer chamber 22. The filter assembly may be secured to turbine housing 12 by suitable fastening means, such as the illustrated bolt and nut arrangements 30. Rear wall 26 preferably has an annular recess 31 formed therein to accommodate filters having radial thicknesses greater than the thickness of filter 20 (FIG. 1).

The filter preferably comprises a plurality of parallel and convoluted or accordion-type paper pleats 32 (FIG. 3). The pleats are preferably positioned to extend axially in the direction of the longitudinal axis of the filter. Cylindrical inner and outer screens 33 and 34 may be utilized to aid in maintaining the pleats in their correct positions.

In one tested filter assembly embodiment the filter comprised the following design specifications: 500 pleats; and effective axial length of 11.75 inches; an inside diameter "A" (FIG. 4) of 21.5 inches; a thickness "B" of 2.0 inches; an effective surface area approximating 163.2 square feet; and a separation "C" from the circular portion of housing 17 of 2.0 inches. The filter paper was a Fram-type having a filter media grade No. 115985, a media base weight of 90 ± 10 lbs/3,000 square feet, and a paper thickness approximating 0.025 inch.

The filter assembly was tested at a face velocity of 14.15 ft./min. with the incoming ambient air flow being uniformly charged with dust particles and exhibiting a flow rate approximating 172.5 lb./min. Cleaning efficiency approximated 99 percent. FIG. 4 further depicts static pressure (in inches of $H_2O$, vacuum) on the "dirty" (chamber 22) and "clean" (chamber 21) sides of the above-described filter.

It should be particularly noted that the nonuniform pressure characteristics of the ambient airflows prevalent in chamber 22 were rendered substantially uniform when communicated to chamber 21 interiorly of the filter. Such a uniform airflow at the entrance to the turbine's compressor intake induces efficient turbine operation. It should be further noted that the pressure drops occurring through the filter are sufficiently low to assure high air densities at the compressor's inlet.

As suggested above, the filter assembly may be utilized with a turbocharger or any other accommodating device or power plant requiring filtered air. Also, various modifications may be made to the illustrated filter assembly embodiment without departing from the spirit of this invention. For example, cowl 18 could be relocated to be centrally disposed at the left side of the filter assembly (FIG. 1) and the housing suitably modified to form passages communicating with chamber 22.

Such a modification could contemplate positioning a cylindrical cowl in substantial axial alignment with intake 13 with the added passages assuring communication of ambient air to chamber 22 and through the filter prior to when the air is discharged into chamber 21. Also, the cross-sectional shape of housing 17 (and thus the outer shape of chamber 22 in FIG. 4) could be modified to assume a rectangular configuration, for example.

As suggested above, annular recess 31 is adapted to accommodate a filter having a greater radial thickness than thickness "A" (FIG. 4). In general, such a larger filter, having deeper (e.g. 4 inches) pleats, could be utilized in conjunction with a larger engine requiring increased airflow. In this connection it should be noted that the convoluted pleats afford an economical and efficient manner by which the effective surface area of the filter may be increased. In most gas turbine applications the filter's radial thickness and inside diameter would be preferably kept within ranges of from 1.0 inch to 6.0 inches and 12.0 to 60.0 inches, respectively.

What is claimed is:

1. A turbine engine comprising a compressor and an air filter assembly, said filter assembly having a housing comprising a peripheral wall and two opposed end walls, an outlet formed in one end wall and an access means formed in the other end wall, a cylindrical air filter mounted in said housing between the end walls and about the outlet and being capable of being introduced and removed through said access means, a removable cover secured to said end wall to close said access means, an inlet opening in the peripheral wall, said filter being spaced from the peripheral wall to define an outer chamber, the intake of the compressor being attached to said outlet and extending into the housing and including a plurality of radially disposed and rotatably mounted blades, said peripheral wall being formed by opposed substantially parallel walls and connected by an arcuate wall, said inlet opening being opposed to the arcuate wall whereby air introduced therein is conducted into said outer chamber to direct air exhibiting nonuniform pressure characteristics radially inwardly through said filter whereby the same will exhibit substantially uniform pressure characteristics as it enters said air intake.

2. The invention of claim 1 wherein said air filter is positioned in substantial overhanging relationship with respect to said air intake.

3. The invention of claim 1 wherein said air filter comprises a plurality of parallel pleats positioned to extend axially in the direction of a central, longitudinal axis of said air inlet filter.

4. The invention of claim 1 wherein said housing is disposed on a longitudinal axis thereof and said inlet opening is disposed with said housing to be substantially parallel relative to said longitudinal axis.

5. The invention of claim 4 wherein said cover is disposed substantially perpendicular relative to said longitudinal axis.

* * * * *